Dec. 9, 1969   C. P. BEAN   3,483,095
PROCESS FOR FILLING PORES
Filed Jan. 12, 1967

Initial
Deposit

Pore
Partially
Filled

Pore Filled
and Capped

Membrane
Reversed for
Second Cap

Inventor:
Charles P. Bean,
by Edward D. Murphy
His Attorney.

United States Patent Office 3,483,095
Patented Dec. 9, 1969

---

3,483,095
PROCESS FOR FILLING PORES
Charles P. Bean, Schenectady, N.Y., assignor to General Electric Company, a corporation of New York
Filed Jan. 12, 1967, Ser. No. 608,911
Int. Cl. B01k 5/00
U.S. Cl. 204—15
15 Claims

ABSTRACT OF THE DISCLOSURE

Pores in a membrane are filled by contacting two solutions which form a precipitate in the pores to form an initial plugging deposit and by electrically driving ions from one solution through the deposit in the pore to fill the pore by reaction with ions in the other solution.

---

The present invention relates to the production of small elements of a desired material distributed in a matrix defined by a different material and more particularly relates to a new process for the production of such elements.

Microminiaturization is an essential in many areas of modern research and development. These areas include, for example, information storage, electronic circuits and devices, electroluminescent, magnetic and superconductive devices as well as photography and other measurement techniques. There is, accordingly, substantial interest in techniques which can produce elements of very small size for use in these areas. The present invention is directed to a method of producing elements and devices for use in these fields which are improved over and reduced in size as compared to the devices previously available.

It is accordingly an object of this invention to provide a new and improved process for filling small pores in a body.

A further object of this invention is the provision of a new and improved method of producing devices comprising a first material and having elemental regions of a second selected material.

Another object of this invention is to provide a new and improved method of producing small elements of a desired material.

It is also an object of this invention to provide new and improved devices comprising elemental regions of a selected material dispersed in a membrane.

Briefly, in according with the embodiment of the present invention, I provided a method of filling pores in a membrane and producing devices of the type described including the steps of preparing solutions of ingredients which react to produce an ionically conductive precipitate, that is, a compound insoluble in both solutions; placing these solutions in apparatus wherein they are separated by a body or member containing holes or pores which are to be filled with the precipitate and reacting the solutions in the pores to produce an initial deposit of the insoluble material. The method further includes applying an electric field to the solutions so as to drive ions from one of the solutions through the precipitate to contact and react with the other of the solutions to extend the precipitated material as far as may be desired through the pore. Further steps such as heating, irradiation, or chemical reaction may also be performed to convert the material precipitated in the pore to another form, for example to another composition or to an element if desired.

Figure 1:
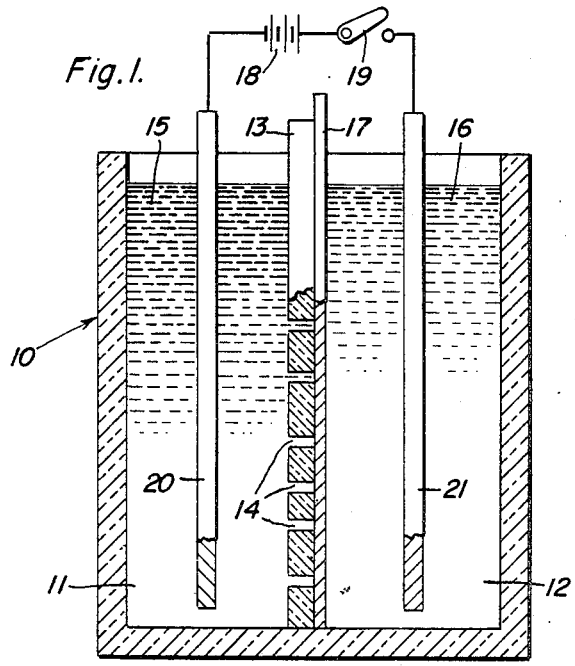
Figure 2A:
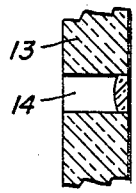
Figure 2B:
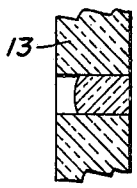
Figure 2C:
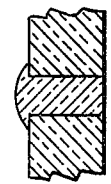
Figure 2D:
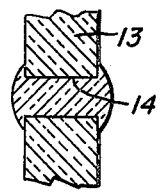

The novel features believed characteristic of the invention are set forth in the appended claims. The invention itself, together with further objects and advantages thereof may best be understood by reference to the following description taken in connection with the appended drawings in which:

FIGURE 1 is an illustration of apparatus for practicing the method of this invention; and FIGURE 2 is a cross-sectional view illustrating the progression of pore filling as the method is carried out.

In the apparatus shown in FIGURE 1, a container or cell 10 is divided into two half cells 11 and 12 by a membrane 13. The membrane comprises a body of the material in which the deposit is to be produced and may comprise any material desired in which pores 14 of a suitable size have been produced. This material is usually an electrical insulator. It is also customary for the membrane to have the sheet-like configuration illustrated in FIGURE 1, although this is not necessary to the practice of this invention and it is not intended to limit either the disclosure or the invention as defined by the appended claims to this embodiment.

As previously noted, the membrane 13 is provided having pores therethrough of the size desired for the deposited material. To take full advantage of the benefits provided by the present invention, it is preferred that these pores be very small, for example in the submicron range in diameter, although larger holes up to 10 microns or more may also be used. In order to achieve pores in this range which are also straight and aligned, it is preferred that the method described and claimed in the previously filed application of Walker and Price, Ser. No. 176,320 and filed Feb. 28, 1962 and assigned to the assignee of this invention, be used; briefly this method comprises the steps of irradiating a material to produce tracks of structural damage caused by the irradiating particles and etching the material in a solution which attacks the damaged tracks at a higher rate than the undamaged material.

The compartments 11 and 12 of container 10 are filled with solutions 15 and 16 which react to form a precipitate which is substantially insoluble in both solutions. For example, for many purposes it is desirable to provide one solution containing a metal ion and another solution containing a halogen ion so that the reaction product produced in the hole is a metallic halide. Other materials may also be used, the only criteria being that the reaction product be substantially insoluble in both solutions and that it be ionically conductive to one of its constituents.

The ionic conduction of the precipitate enables the pore to be filled after the initial deposit has plugged the pore and prevented further contact of the liquids. This is done by supplying an electric field between the solutions to drive ions through the deposit to contact and reaction with the other solution. In anticipation of this step, the membrane is first exposed to the solution containing the less easily conducted constituent of the precipitate and then to the solution containing the more easily conducted precipitate. Thus, the first of these solutions fills the pores and, when the second contacts it, the initial precipitate forms and deposits on the side of the second solution. When the electric field is applied, the deposit is extended through the pore in the direction of the first solution. This order of exposure of the membrane to the solutions may be accomplished simply by pouring the solutions into the compartments 11 and 12 in the proper order or by providing a barrier 17 which is on the side of the more easily conducted ions which is removed after the solutions have been placed in the compartments.

After the initial precipitate has been deposited in the pores 14, an electric field is established between the solutions, for example, by means of a battery 18, switch 19 and the electrodes 20 and 21. The potential difference is selected to be in the proper direction so as to drive the more easily conducted ions from one solution through the initial deposit of precipitate into contact with the other solution. Thus, as these ions are driven through the deposit, they emerge at the interface between the precipitate and the other solution and immediately react with ions from the other solution to form more of the precipitate and thus extend the deposit. This process is continued, as illustrated in FIGURE 2A, 2B, 2C and 2D until the hole is filled to the desired extent. It is noted that the process may also be continued to establish a cap which extends beyond the membrane 13 and overlaps the boundary of the pore. A similar cap may be produced on the other end of the pore by reversing the membrane 13 relative to the solutions and field and extending the deposit to produce the cap. These caps serve to anchor the deposit in the pore and, in particular cases, may not be needed.

The method of this invention is, in general, applicable for filling pores in any membrane material as long as it is substantially non-conductive to the various ions in the solutions which might otherwise be driven through the membrane by the electric field. The precipitate may comprise any product of a chemical reaction between solutions which is ionically conductive. Thus, for example, pores in an insulating material may be filled with a photosensitive material such as silver bromide, a photoconductive material such as lead sulfide or ferromagnetic materials such as magnetic ($Fe_3O_4$) or nickel-manganese ferrite. In addition, the compound precipitated in the pores may be converted, for example, by irradiation, heat, etc. to form other materials such as conductive members, for example of silver or copper. Thus, the process may be used to produce fine leads for connections in microcircuits or similar applications, or to produce an anisotropically conducting member.

By way of example, the following chemical equations are set forth to illustrate the variety of types of materials which may be deposited in accord with this invention. It is not intended, however, to limit this invention to these materials since there is a wide variety of other possible reactions which might be used.

$KCl + AgNO_3 \rightarrow KNO_3 + AgCl\downarrow$ photosensitive
$NaBr + AgNO_3 \rightarrow NaNO_3 + AgBr\downarrow$ photosensitive
$Pb(OCOCH_3)_2 + 2NaOH \rightarrow 2Na(OCOCH_3)$
$\qquad + H_2O + PbO\downarrow$ photoconducting
$Pb(OCOCH_3)_2 + H_2S \rightarrow 2HOCOCH_3$
$\qquad + PbS\downarrow$ photoconducting
$CdCl_2 + H_2S \rightarrow 2HCl + CdS\downarrow$ photoconducting
$8NaOH + 2FeCl_3 + FeCl_2 \rightarrow 8NaCl$
$\qquad + 4H_2O + Fe_3O_4\downarrow$ ferromagnetic
$8NaOH + 2FeCl_3 + NiCl_2 \rightarrow 8NaCl$
$\qquad + 4H_2O + NiFe_2O_4\downarrow$ ferromagnetic
$8NaOH + 2FeCl_3 + Ni_{0.5}Cl_2 \rightarrow 8NaCl + 4H_2O$
$\qquad + Ni_{0.5}Zn_{0.5}Fe_2O_4\downarrow$ ferromagnetic
$8NaOH + 2FeCl_3 + Ni_{0.5}Mn_{0.5}Cl_2 \rightarrow 8NaCl$
$\qquad + 4H_2O + Ni_{0.5}Mn_{0.5}Fe_2O_4\downarrow$ ferromagnetic In addition, the silver bromide mentioned above may be converted by light irradiation to pure silver to form electrical leads through the insulator. In a particular case, I have prepared a membrane of polycarbonate resin sold under the trademark of Lexan which was 8 microns thick. The resistance across the 8 micron thickness after pores had been prepared was $10^{10}$ ohms. After pore filling and conversion to silver, the resistance across the same thickness was less than 0.1 ohm. In both cases, the lateral resistance across a distance of about 1 mm. is on the order of $10^{10}$ ohms. Thus, pore filling and conversion to silver in accord with this invention produced an anisotropically conducting device.

As another example of the use of this method, the following reaction can be used to produce lead iodide:

$Pb(NO_3)_2 + 2KI \rightarrow 2KNO_3 + PbI_2$ which may be converted to lead by heating and irradiating with visible light, X-rays or electrons. Thus, an array of superconductive lead rods can be formed.

In addition to the various uses disclosed above, this method may be used for various other purposes. For example, by removing the insulating member after filling the pores, large numbers of elongated fine particles of the various mentioned materials may be produced. It is also noted that gas permeable membranes, for example of cellulose acetate, which have pinholes as fabricated or which become leaky in use may be repaired by plugging the holes with a suitable material such as a silver halide.

With regard to the insulating member in which the pores are formed and filled, any material containing small openings therethrough may be used. In view of the small sizes (approximately 60 Angstrom units) and the large density ($10^{10}$ per square centimeter) of pores which may be produced, it is preferred to use the process of the aforementioned application of Price and Walker. In general, my process is also applicable to a variety of materials including porous glass, microporous cellulose, cellulose acetate and others.

As previously mentioned, full advantage of this invention can best be made by using pores which are as small as possible. The minimum size is limited only by the size of the ions involved in the reaction; that is, the pore must be large enough to permit passage of the ions. The maximum size of the pores is limited by the requirement that the initial deposit must be able to form and remain at the desired location in the pore. The pore should be sufficiently small in cross section so that the plug substantially fills it and does not spill out. If the adherence between the deposit and the membrane is not sufficient to hold the plug in place, the precipitate may be extended beyond the pore on one side and then, by reversing the membrane, on the other to provide opposing nail-heads or caps which secure the plug in place. In general, to meet these requirements, the cross-sectional dimensions of the pore should not be substantially greater than the thickness of the membrane.

The following examples are set forth to exemplify the practice of this invention. These examples include specific values of the parameters involved so that the invention may be practiced by those skilled in the art. It is noted however, that these examples are provided for purposes of illustration only and are not to be construed in a limiting sense.

EXAMPLE 1

An 8 micron thick strip of the polycarbonate resin polymer sold under the trademark Lexan was irradiated with fission fragments and etched in NaOH to produce pores through the strip. The pores were 4 microns in diameter and the density was $1.7 \times 10^4$ pores per cm.$^2$. The strip was clamped between two Lucite chambers fitted with platinum electrodes. Approximately 0.7 cm.$^2$ of surface exposed to each chamber. A solution of 0.1 N KCl was inserted into one chamber and then a solution of 0.03 N $AgNO_3$ was inserted into the other chamber. At this instant, some colloidal precipitate formed on the silver nitrate side, demonstrating that some KCl had passed through the pores. An electric field was then applied to the electrodes, the silver nitrate side being made positive, and a current of $10^{-5}$ amps was passed for a total of $10^3$ seconds. Thus, the total charge transferred was $10^{-2}$ coulombs which corresponds to about twice the electrochemical equivalent of the charge transport needed to fill the pores with silver chloride. Upon examination, each pore was found to be filled with a colorless material which, by chemical tests, was shown to be silver chloride. In addition, each pore had a cap of about 50 microns diameter on the KCl side.

EXAMPLE 2

An 8 micron thick strip of the polycarbonate resin polymer sold under the trademark Lexan was irradiated with fission fragments and etched in NaOH to produce pores through the strip. The pores were 4 microns in diameter and the density was $1.7 \times 10^4$ pores per cm.$^2$. The strip was clamped between two lucite chambers fitted with platinum electrodes. Approximately 0.7 cm.$^2$ of surface was exposed to each chamber. A solution of 0.1 N KBr was inserted into one chamber and then a solution of 0.03 N AgNO$_3$ was inserted into the other chamber. At this instant, some colloidal precipitate formed on the silver nitrate side, demonstrating that some KBr had passed through the pores. An electric field was then applied to the electrodes, the silver nitrate side being made positive, and a current of $10^{-5}$ amps was passed for a total of $10^3$ seconds. Upon examination, each pore was found to be filled with a colorless material which, by chemical tests, was shown to be silver bromide.

The strip was then exposed to ultraviolet light and developed in the photographic developer sold under the trademark Dektol and rinsed in a photographic fixing solution. The pores were then found to be filled with silver. The electrical resistance of the strip across its thickness prior to pore filling was found to be $10^{10}$ ohms. After pore filling and conversion to silver, the resistance across the thickness was less than 0.1 ohm. The resistance in a direction perpendicular to the pores over a distance of one mm., both before and after filling and conversion to silver, was more than $10^{10}$ ohms.

EXAMPLE 3

A strip of Lexan polycarbonate resin was prepared as described in Example 1. A 2% by weight solution of CdCl$_2$ in water was put in one chamber and then a saturated solution of H$_2$S in water was put in the other chamber. An electric field was applied to the electrodes, the cadmium chloride side being made positive, and a current of $10^{-5}$ amps was passed for $10^3$ seconds. At the end of this time, the pores were found to be filled with cadmium sulfide.

EXAMPLE 4

A strip of Lexan polycarbonate resin was prepared as described in Example 1. A saturated solution of PbCl$_2$ in water was put in one chamber and then a saturated solution of H$_2$S in water was put in the other chamber. An electric field was applied to the electrodes, the lead chloride side being made positive, and a current of $10^{-5}$ amps was passed for $10^3$ seconds. At the end of this time, the pores were found to be filled with lead sulfide.

EXAMPLE 5

A 3.4 micron thick strip of mica was irradiated and the damage tracks etched in hydrofluoric acid to produce pores through the strip having a radius of 50 angstrom units. The strip was mounted as described in Example 1. A solution of 0.03 N KCl was put into one chamber and then a solution of 0.03 N AgNO$_3$ was put into the other chamber. An electric field was applied to the electrodes, the silver nitrate side being made positive, and a current of $10^{-5}$ amps was passed for 300 seconds. Upon examination, each pore was found to be filled with silver chloride and caps extended from each pore on the KCl side of the strip.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. A method of depositing precipitate in the pores of a porous body comprising the steps of
    providing ion-containing solutions which react to form an ionically conducting precipitate;
    disposing said solutions on opposite sides of said porous body so that one solution passes initially through the pores to contact and react with the solution on the opposite side thereby depositing said precipitate on that one side of the body at the openings of the pores; and
    establishing an electric field between said solutions to transfer ions from the solution on the side of said body wherein said precipitate has formed through said precipitate to react with the other of said solutions and extend said precipitate unilaterally in said pores.

2. The method claimed in claim 1 wherein the cross-sectional dimensions of said pores are in the range of from the size of said ions transferred by said current up to the thickness of said body.

3. The method claimed in claim 1 wherein said transfer of ions is carried on for a time sufficient to fill said pores and produce a cap of said precipitate over the pore opening.

4. The method claimed in claim 3 and including the additional step of reversing said body relative to said solutions and said electric field to produce a cap of said precipitate on the opposite side of said body.

5. The method claimed in claim 3 wherein said transfer of ions is continued to produce a cap having a diameter substantially greater than the cross-sectional dimensions of said pore.

6. The method claimed in claim 1 wherein said body is nonconductive to ions in either of said solutions which are of a polarity to be driven toward the other of said solutions by said electric field.

7. The method claimed in claim 1 and comprising the additional step of converting said precipitate to another material.

8. The method claimed in claim 7 wherein said body comprises an electrical insulator and said material comprises a conductor.

9. The method claimed in claim 8 wherein the density of said pores in said body is substantially constant to enable said pores to define an image of an energy pattern presented to one surface if said body.

10. The method claimed in claim 1 and comprising the additional step of converting said precipitate to another material.

11. The method claimed in claim 1 wherein said body comprises a non-magnetic material and said precipitate comprises a magnetic material.

12. The method claimed in claim 1 wherein said precipitate comprises a substance having a property which is responsive to electromagnetic radiation.

13. A method claimed in claim 1 wherein said precipitate comprises a structurally rigid material.

14. A method claimed in claim 1 wherein said electrical field is maintained for a time sufficient to substantially fill said pores.

15. A method claimed in claim 1 wherein said pores through said body are substantially entirely isolated from one another and are substantially rectilinear.

References Cited

UNITED STATES PATENTS

| | | | |
|---|---|---|---|
| 2,217,334 | 10/1940 | Diggory et al. | 204—15 |
| 2,682,501 | 6/1954 | Teal | 204—15 |
| 3,303,110 | 2/1967 | Hays | 204—15 |
| 3,304,244 | 2/1967 | Granitsas | 204—15 |

JOHN H. MACK, Primary Examiner

T. TUFARIELLO, Assistant Examiner

U.S. Cl. X.R.

204—16